United States Patent Office.

WILLIAM C. GRIMES, OF LADIESBURG, MARYLAND.

Letters Patent No. 72,026, dated December 10, 1867.

IMPROVED FERTILIZER.

The Schedule referred to in these Letters Patent and making part of the same.

TO ALL WHOM IT MAY CONCERN:

Be it known that I, WILLIAM C. GRIMES, of Ladiesburg, in the county of Frederick, and in the State of Maryland, have invented a new and useful Process for the Manufacture of Fertilizers; and do hereby declare that the following is a full, clear, and exact description thereof.

My invention consists in the process for the manufacture of fertilizers of the ingredients herein specified.

For the manufacture of (for instance) a ton of fertilizer, I first place about eight (8) bushels of ground or crushed bone in any suitable vessel; then add to it eighty pounds (or thereabouts) of sulphate of soda; and upon both I place about one hundred and eighty (180) pounds of oil of vitriol. This oil dissolves the other ingredients in about two (2) hours. After having been dissolved, add about forty (40) gallons urine, and to that add about ten (10) bushels of rich earth, and place the entire mixture out to dry before using.

By these means a fertilizer is formed which can be made by almost any person, and in manner to cost much less than those heretofore used. This fertilizer has been found to be equal to any previously used.

What I claim as new, and desire to secure by Letters Patent, is—

Forming a fertilizer in the manner herein described, of the ingredients and proportions, substantially as specified.

In testimony that I claim the foregoing, I have hereunto set my hand, this 7th day of August, 1867.

WM. C. GRIMES.

Witnesses:
C. M. ALEXANDER,
J. M. MASON.